(12) United States Patent
Inui et al.

(10) Patent No.: US 7,304,454 B2
(45) Date of Patent: Dec. 4, 2007

(54) INFORMATION PROCESSING APPARATUS FOR SETTING CHARGE-START CRITERIA LEVEL BASED ON POWER SUPPLY DRIVE HISTORY

(75) Inventors: Takashi Inui, Yokohama (JP); Mizuho Tadokoro, Yamato (JP)

(73) Assignee: Lenovo Singapore Pte. Ltd., Singapore (SG)

( * ) Notice: Subject to any disclaimer, the term of this patent is extended or adjusted under 35 U.S.C. 154(b) by 492 days.

(21) Appl. No.: 11/020,993

(22) Filed: Dec. 22, 2004

(65) Prior Publication Data

US 2005/0156571 A1   Jul. 21, 2005

(30) Foreign Application Priority Data

Dec. 22, 2003   (JP) .............................. 2003-425112

(51) Int. Cl.
*H02J 7/16* (2006.01)
(52) U.S. Cl. ...................................... 320/155; 320/149
(58) Field of Classification Search ................ 320/106, 320/132, 149, 155, 134; 324/427
See application file for complete search history.

(56) References Cited

U.S. PATENT DOCUMENTS

2004/0232885 A1* 11/2004 Sakai et al. ................. 320/132

FOREIGN PATENT DOCUMENTS

| JP | 09-233722 | 9/1996 |
|----|-----------|--------|
| JP | 09-205736 | 8/1997 |
| JP | 2001-136673 | 5/2001 |
| JP | 2002-223529 | 8/2002 |
| JP | 2002-315198 | 10/2002 |

* cited by examiner

*Primary Examiner*—Bao Q. Vu
*Assistant Examiner*—Aaron Piggush
(74) *Attorney, Agent, or Firm*—Carlos Munoz-Bustamante

(57) ABSTRACT

An information processing apparatus driven by an AC power supply or a rechargeable battery has a charge directing unit which initiates charging of the battery from the AC power supply, provided that the remaining amount of power of the battery is lower than a predetermined charge-start-criteria level and that the information processing apparatus is driven by the AC power supply. Also included is a drive history storage which stores a drive history including information indicating which of the AC power supply and the battery was driving the information processing apparatus in each time period in the past. A recharge-start-criteria-level-setting unit sets the charge-start-criteria level on the basis of the drive history.

12 Claims, 10 Drawing Sheets

System use history

| Day of week | Time period | | Drivable by AC power supply | Operating in G0 state | Operating in G1 state | OFF state |
|---|---|---|---|---|---|---|
| | Time | | | | | |
| Sunday | 0:00~0:10 | | 100% | 25% | 25% | 50% |
| | 0:10~0:20 | | 75% | 25% | 25% | 50% |
| | ... | | ... | ... | ... | ... |
| Monday | 0:00~0:10 | | 25% | 25% | 25% | 50% |
| | 8:00~8:10 | | 50% | 25% | 25% | 50% |
| | 8:10~8:20 | | 75% | 50% | 50% | 0 |
| | 8:20~8:30 | | 75% | 50% | 50% | 0 |
| | ... | | ... | ... | ... | ... |
| | 16:00~16:10 | | 100% | 100% | 0 | 0 |
| ... | ... | | ... | ... | ... | ... |
| Saturday | 10:00~10:10 | | 10% | 85% | 0 | 15% |
| | 10:10~10:20 | | 5% | 90% | 5% | 5% |
| | ... | | ... | ... | ... | ... |
| | 18:00~18:10 | | 10% | 95% | 0% | 5% |
| | 18:10~18:20 | | 5% | 90% | 0% | 10% |
| | ... | | ... | ... | ... | ... |

Battery use history

| Serial Number | Cycle count | Full charge capacity | Discharge information ||| Charge information |||
|---|---|---|---|---|---|---|---|---|
| | | | Cycles | Discharge start remaining amount | Discharge time | Cycles | Charge start remaining amount | Charge time |
| 32×××× | 24 | 3431 | 62 | 98%<br>86%<br>...... | 1.2 Hours<br>0.5 Hour<br>...... | 65 | 72%<br>92%<br>...... | 1 Hour<br>0.5 Hour<br>...... |
| ...... | ...... | ...... | | ...... | | | ...... | |

INFORMATION PROCESSING APPARATUS FOR SETTING CHARGE-START CRITERIA LEVEL BASED ON POWER SUPPLY DRIVE HISTORY

BACKGROUND OF THE INVENTION

1. Field of the Invention

The present invention relates to an information processing apparatus capable of being powered by a rechargeable battery. More particularly, the present invention relates to adaptive methods and apparatus for controlling the charging and discharging of the battery.

2. Background

In recent years, small lightweight information terminals (or portable computers) have come into wide use. Such information terminals are ordinarily provided with rechargeable batteries which enable the information terminals to be used while being carried outdoors or in the field. Each of the batteries is charged by an AC power supply when the information terminal is connected to the AC power supply, and can drive the information terminal when the information terminal is disconnected from the AC power supply.

Various kinds of batteries such as nickel-cadmium batteries, nickel-hydrogen batteries and lithium-ion batteries are being used. Such batteries typically degrade due to repeated charging and discharging. For example, with a nickel-cadmium battery or the like, there is a memory effect problem due to repeated charging after partial discharge. With other types of batteries free of the memory effect, there is also a problem that a control circuit incorporated in the battery is incapable of suitably controlling the full charge capacity which changes as the battery experiences repeated charge and discharge cycles.

Various techniques relating to these known problems have been proposed. See, for examples, Published Unexamined Patent Application No. 9-233722, Published Unexamined Patent Application No. 9-205736, Published Unexamined Patent Application No. 2001-136673, Published Unexamined Patent Application No. 2002-315198, and Published Unexamined Patent Application No. 2002-223529.

Technologies have been used that automatically starts charging a battery of an information processing device without any direction from a user when the device is connected to an AC power supply. This conveniently eliminates the need for troublesome operations for recharging and allows a sufficient amount of power of the battery to be maintained as long as possible. However, the technology starts charging on connection to an AC power supply even if the remaining amount of battery power is so sufficient that charging is not required. Consequently, the number of recharges of the battery increases and therefore the battery may degrade sooner.

When a battery degrades, the full charge capacity of the battery is reduced. At this time, a control circuit incorporated in the battery changes the upper limit of the amount of charging on the basis of information on the number of charging/discharging cycles, the charge/discharge capacity and the battery terminal voltage for example for the purpose of preventing overcharging of the battery. In some cases, e.g., a case where a short charging/discharging cycle is repeated, however, there is a possibility that the actual full charge capacity and the upper limit of the amount of charging set by the control circuit will differ from each other as a result of accumulation of errors in information about the battery. A user may perform a regeneration process of repeating complete charging and complete discharging to reset the upper limit of the amount of charging set by the control circuit to the actual full charge capacity. A comparatively long time is required to perform the regeneration process, but it is difficult for the user to determine in advance whether the full charge capacity can be actually recovered by the regeneration process. The conventional art therefore entails a possibility of failure to suitably perform the regeneration process for enabling the battery to perform the essential function.

Therefore, an object of the present invention is to provide an information processing apparatus and related methods capable of solving the above-described problem. This object can be attained by a combination of features described in the independent claims in the appended claims. In the dependent claims, further advantageous examples of the present invention are specified.

SUMMARY OF THE INVENTION

To achieve the above-described object, according to a first aspect of the present invention, there is provided an information processing apparatus driven by an AC power supply or a rechargeable battery, the apparatus having a charge directing unit for initiating charging of the battery from the AC power supply, provided that the remaining amount of power of the battery is lower than a predetermined charge-start-criteria level and that the information processing apparatus is driven by the AC power supply, a drive history storage for storing a drive history in which information indicating which of the AC power supply and the battery was driving the information processing apparatus in each time period in the past is recorded, and a recharge-start-criteria-level-setting unit for setting the charge-start-criteria level on the basis of the drive history, a control method for controlling the information processing apparatus, a program and a recording medium.

In the summary of the present invention, not all the necessary features of the invention are listed. Subcombinations of the features can also constitute the present invention.

BRIEF DESCRIPTION OF THE DRAWINGS

For a more complete understanding of the present invention and the advantages thereof, reference is now made to the following description taken in conjunction with the accompanying drawings.

FIG. 2 shows an example of a system use history in drive history stored by a drive history storage 20;

FIG. 3 shows an example of a battery use history in the drive history stored by the drive history storage 20;

DETAILED DESCRIPTION OF PREFERRED EMBODIMENTS OF THE PRESENT INVENTION

The present invention will be described with respect to an embodiment thereof. The embodiment described below, however, is not limiting of the invention set forth in the appended claims, and all combinations of features described in the description of the embodiment are not necessarily indispensable to the solution according to the present invention.

Figure 1:
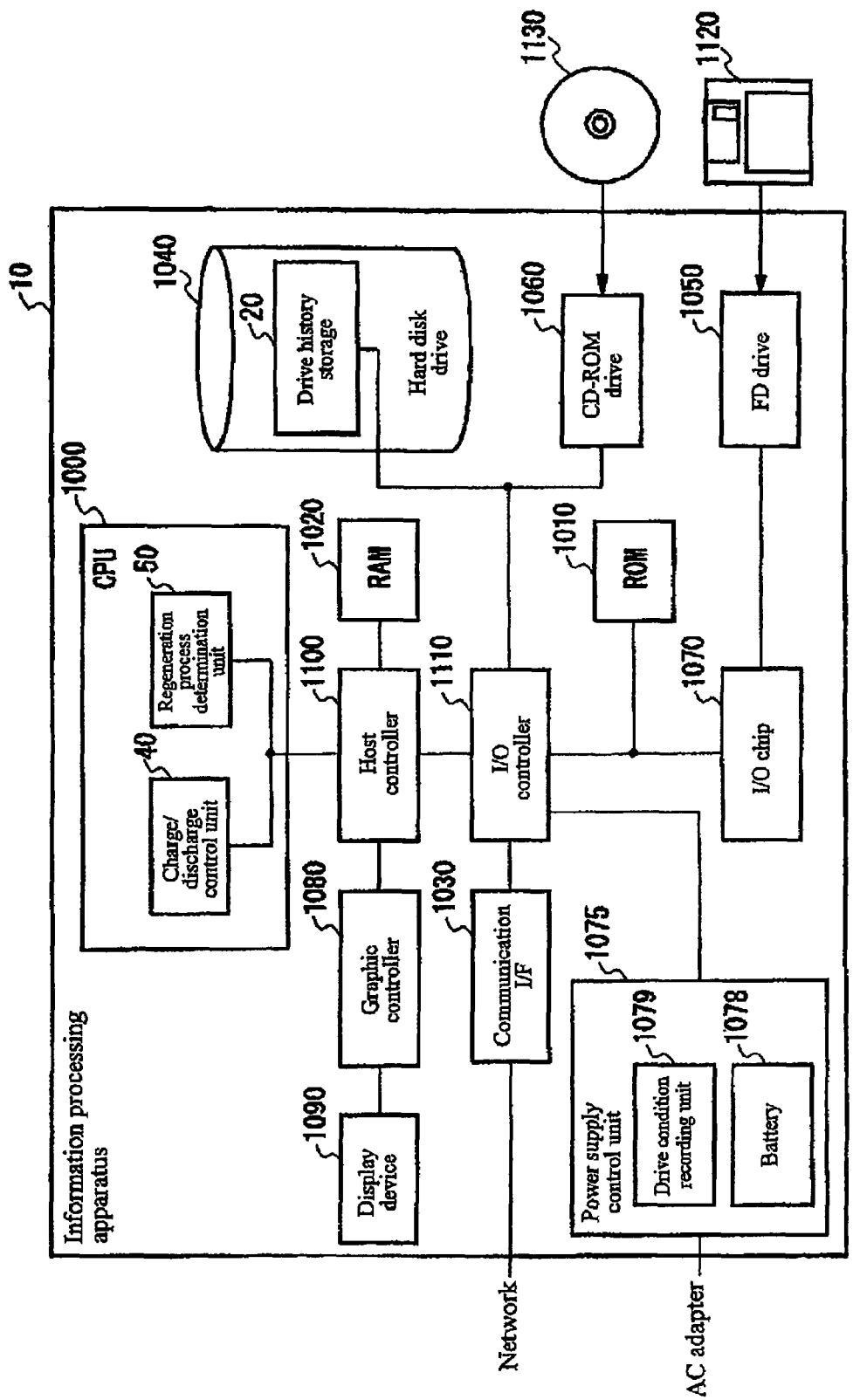
FIG. 1 is a block diagram of an information processing apparatus 10.

FIG. 1 is a block diagram of an information processing apparatus 10. The information processing apparatus 10 is intended to prevent degradation of a battery by suitably controlling conditions for charging of the battery and to adjust the timing of execution of a battery regeneration process for regenerating the battery from a degraded state.

The information processing apparatus 10 is provided with a CPU peripheral unit having a CPU 1000, a RAM 1020, a graphic controller 1080 and a display device 1090 connected to each other by a host controller 1100, an input/output unit having a communication interface 1030, a hard disk drive 1040 and a CD-ROM drive 1060 connected to the host controller 1100 by an I/O controller 1110, and a legacy input/output unit having a ROM 1010, a flexible disk drive 1050, an I/O chip 1070 and a power supply control unit 1075 connected to the I/O controller 1110. The host controller 1100 connects the RAM 1020, and the CPU 1000 and the graphic controller 1080, which access the RAM 1020 at a high transfer rate.

The CPU 1000 operates on the basis of programs stored in the ROM 1010 and the RAM 1020 to control each component. For example, the CPU 1000 functions as a charge/discharge control unit 40 which sets a condition for starting charging of a battery 1078 and a condition for stopping started charging and a regeneration process determination unit 50 which performs a battery regeneration process for recovering the full charge capacity reduced by repeated charging or discharging. The charge/discharge control unit 40 and the regeneration process determination unit 50 may be implemented, for example, as functions of an operating system which controls the information processing apparatus 10, as a device driver which operates on the operating system and controls the power supply control unit 1075, or as a BIOS program stored in the ROM 1010.

The communication interface 1030 communicates with an external unit via a network. The hard disk drive 1040 stores programs and data used by the information processing apparatus 10. For example, the hard disk drive 1040 functions as a drive history storage 20 which stores a drive history in which information indicating which of the AC power supply and the battery 1078 has driven the information processing apparatus 10 in a past predetermined period is recorded. In the following description, the past predetermined period is referred to as a drive condition observation period. The information processing apparatus 10 operates in either of a normal mode in which the CPU 1000 performs computation processing and an energy saving mode in which the CPU 1000 does not perform computation processing and in which the power consumption is reduced relative to that in the normal mode. The drive history storage 20 may further store, as drive history, information indicating in which of the normal mode and the energy saving mode the information processing apparatus 10 has operated in the period.

The power supply control unit 1075 is detachably attached to the AC adaptor provided on the outside. Electric power obtained from the AC adaptor or the battery 1078 is supplied to each component of the information processing apparatus 10. When the power supply control unit 1075 receives an instruction from the CPU 1000 through the I/O controller 1110, it starts or stops charging the battery 1078. Also, the power supply control unit 1075 has a drive condition recording unit 1079 which periodically detects the condition of driving of the information processing apparatus 10 and records the detected condition in the drive history storage 20. The graphic controller 1080 obtains image data generated by the CPU 1000, etc., on a frame buffer provided in the RAM 1020, and displays the image data on the display device 1090. Alternatively, the graphic controller 1080 may contain therein a frame buffer for storing image data generated by the CPU 1000, etc. The I/O controller 1110 also connects, to the host controller 1100, the communication interface 1030, the hard disk drive 1040 and the CD-ROM drive 1060, which are input/output devices of a comparatively high speed.

The CD-ROM drive 1060 reads a program or data from a CD-ROM 1130 and provides the read program or data to the I/O chip 1070 via the RAM 1020. To the I/O controller 1110 are connected the ROM 1010 and input/output devices of a comparatively low speed, e.g., the flexible disk drive 1050 and the I/O chip 1070. The ROM 1010 stores programs including a boot program executed by the CPU 1000 at the time of startup of the information processing apparatus 10 and programs dependent on the hardware of the information processing apparatus 10. The flexible disk drive 1050 reads a program or data from a flexible disk 1120 and provides the read program or data to the I/O chip 1070 via the RAM 1020. The I/O chip 1070 connects the flexible disk 1120 and various input/output devices, for example, through a parallel port, a serial port, a keyboard port and a mouse port.

A program provided to the information processing apparatus 10 is provided by a user in a state of being stored on a recording medium, such as the flexible disk 1120, the CD-ROM 1130, or an IC card. The program is read out from the recording medium and installed in the information processing apparatus 10 via the I/O chip 1070 and/or the I/O controller 1110, and is executed in the information processing apparatus 10. The program installed and executed in the information processing apparatus 10 includes various modules which enable the CPU 1000 to function as the charge/discharge control unit 40 and the regeneration process determination unit 50. The program also enables the hard disk drive 1040 to function as the drive history storage 20. Operations which the information processing apparatus 10 is made by the modules to perform will be described below with reference to FIGS. 2 to 10.

The above-described program or modules may be stored on an external storage medium. As the recording medium, an optical recording medium such as a DVD or a PD, a magneto-optic recording medium such as an MD, a tape medium, a semiconductor memory such as an IC card, or the like can be used as well the flexible disk 1120 and the CD-ROM 1130. Also, a storage device such as a hard disk or a RAM provided in a server system connected to a special-purpose communication network or the Internet may be used as the recording medium to provide the program to the information processing apparatus 10 via the network.

FIG. 2 shows an example of a system use history in the drive history stored by the drive history storage 20. The drive history storage 20 stores, as a system use history, the informations which record the proportion of a length of time during which the information processing apparatus 10 was drivable by the AC power supply, the proportion of a length of time during which the information processing apparatus 10 operated in a G0 state, the proportion of a length of time during which the information processing apparatus 10 operated in a G1 state, and the proportion of a length of time during which the information processing apparatus 10 was in an OFF state with respect to each of time periods. The state in which the information processing apparatus 10 was drivable by the AC power supply may be, for example, a state in which the AC adapter was attached to the information processing apparatus 10, or a state in which the information processing apparatus 10 was actually supplied with power from the AC adapter.

The G0 state is an example of the normal mode in which the CPU 1000 of the information processing apparatus 10 performs computation processing. The G1 state is an example of the energy saving mode in which the CPU 1000 does not perform computation processing and the power consumption is reduced relative to that in the G0 state. More specifically, the G1 state is, for example, a sleep mode in which the operation of the information processing apparatus 10 is temporarily stopped in such a manner that the information processing apparatus 10 stops supply of power to the CPU 1000 while supplying power only to the RAM 1020. The OFF state is a state in which power to the information processing apparatus 10 is shut off. More specifically, not only power supply to the CPU 1000 but also power supply to the RAM 1020 is stopped. For example, the OFF state is a state called a G2 state, a G3 state, a hibernation mode, or a halt mode. The present invention may equally be applied to an information processing apparatus having more or different operating modes.

Each of time periods in this embodiment is a range of time defined by dividing one week by 10 minutes and expressed as a day of the week and a set of times in this table. For example, the proportion of a length of time during which drive by the AC power supply was performed in the time period from 0:00 to 0:10 on Sunday is the average of lengths of time during which drive by the AC power supply was possible in the time periods from 0:00 to 0:10 on all Sundays in past eight weeks. Alternatively, each time period may be a range of time defined by dividing one day by 10 minutes or by dividing a weekday or a holiday by 10 minutes.

The drive condition recording unit 1079 periodically detects the condition of driving of the information processing apparatus 10 and records detection results in a structure illustrated in this table in the drive history storage 20. For example, the drive condition recording unit 1079 may regard the information processing apparatus 10 as drivable by the AC power supply over each time period if the information processing apparatus 10 is drivable by the AC power supply at the beginning of the time period. The drive condition recording unit 1079 may perform detection a certain number of times as to whether or not the information processing apparatus 10 is drivable by the AC power supply in each time period. In such a case, the drive condition recording unit 1079 may treat the proportion of the number of times the information processing apparatus 10 is drivable by the AC power supply in the number of times detection is performed in each time period as the proportion of a length of time during which the information processing apparatus 10 is drivable by the AC power supply in the time period.

FIG. 3 shows an example of a battery use history in the drive history stored by the drive history storage 20. The drive history storage 20 stores, as a battery use history, a serial number for each of batteries attached to the information processing apparatus 10, a cycle count indicating the total charge capacity from the start of use of the battery to the present time, the full charge capacity, i.e., the capacity in the case of fully charging the battery at the present point in time, discharge information about discharging of the battery and charge information about charging of the battery while associating these information items with each other.

The drive history storage 20 stores, as discharge information, with respect to each battery, the number of times the information processing apparatus 10 has been driven by the battery from the start of use of the battery to the present time, i.e., the number of times the battery has been discharged, the remaining amount of power of the battery at each of the points in time at which discharging is started, and the time required to discharge the battery in each discharge event. The drive history storage 20 also stores, as charge information, with respect to each battery, the number of times the battery has been charged from the start of use of the battery to the present time, the remaining amount of power of the battery at each of the points in time at which charging is started, and the time required to charge the battery in each charge event.

Figure 4:
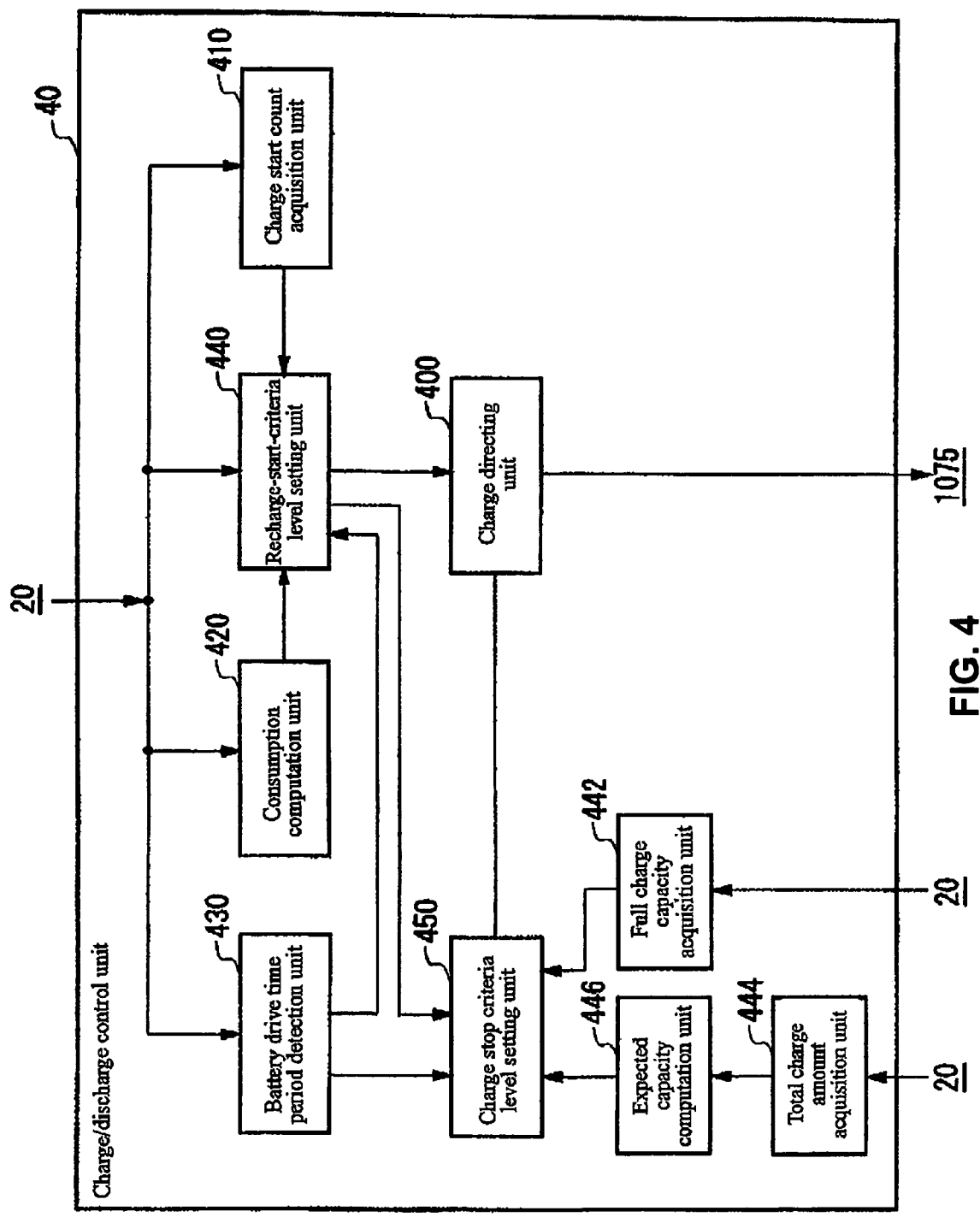
FIG. 4 is a block diagram of a charge/discharge control unit 40.

FIG. 4 is a block diagram of the charge/discharge control unit 40. The charge/discharge control unit 40 includes a charge directing unit 400, a charge start count acquisition unit 410, a consumption computation unit 420, a battery drive time period detection unit 430, a recharge-start-criteria level setting unit 440, a full charge capacity acquisition unit 442, a total charge amount acquisition unit 444, an expected capacity computation unit 446, and a charge stop criteria level setting unit 450. The charge directing unit 400 starts charging the battery 1078 by the AC power supply provided that the remaining amount of power of the battery 1078 is lower than a predetermined charge-start-criteria level, when the information processing apparatus 10 is driven by the AC power supply. The charge directing unit 400 stops charging the battery 1078 when the remaining amount of power of the battery 1078 reaches a predetermined charge stop criteria level. However, the charge directing unit 400 continues charging the battery 1078 by the AC power supply regardless of the charge-start-criteria level or the charge stop criteria level when it receives an urgent charging direction from a user.

The charge start count acquisition unit 410 computes, on the basis of the drive history obtained from the drive history storage 20, the number of times the remaining amount of power of the battery 1078 when charging is started during drive condition observation period is determined as a value higher than a predetermined charge-start-criteria level candidate lower than the charge-start-criteria level. The consumption computation unit 420 computes, on the basis of the drive history obtained from the drive history storage 20, the maximum consumption of power of the battery 1078 that the information processing apparatus 10 continuously consumed in the past without being driven by the AC power supply. The battery drive time period detection unit 430 detects, on the basis of the drive history obtained from the drive history storage 20, a battery drive time period which is a continuous time period in which the proportion of a length of time during which the information processing apparatus 10 was driven by the battery 1078 in the past is higher than a predetermined reference proportion.

The recharge-start-criteria level setting unit 440 sets the charge-start-criteria level on the basis of the number of times the remaining amount of power of the battery 1078 at the point in time at which charging is started in the drive condition observation period is determined as a value higher than the charge-start-criteria level candidate and the computed maximum consumption of power of the battery 1078. In a case where the length of time during which the information processing apparatus 10 operated in the G0 state while being driven by the battery 1078 is shorter in the drive condition observation period, the recharge-start-criteria level setting unit 440 reduces the charge-start-criteria level relative to that in a case where the corresponding length of time is longer. Further, when a point in time closer to a battery drive time period is reached, the recharge-start-criteria level setting unit 440 increases the charge-start-criteria level relative to that at a point in time remoter from the battery drive time period. The recharge-start-criteria level setting unit 440 may change the charge-start-criteria level on the basis of the frequency with which the urgent charge direction is input.

The full charge capacity acquisition unit 442 obtains the current full charge capacity of the battery 1078 from the drive history storage 20. The total charge amount acquisition unit 444 obtains from the drive history storage 20 the cycle count indicating the total amount of charging from the start of use of the battery 1078 to the present time. The expected capacity computation unit 446 computes an expected capacity which is a full charge capacity which the battery 1078 should presently have, on the basis of the full charge capacity (e.g., a rated capacity) at the point in time at which use of the battery 1078 was started and the cycle count.

The charge stop criteria level setting unit 450 sets the charge stop criteria level to a value lower than the full charge capacity of the battery 1078 on the basis of the drive history obtained from the drive history storage 20 in a case where the recharge-start-criteria level setting unit 440 has reduced the charge-start-criteria level and where the current full charge capacity of the battery 1078 is smaller than an expected capacity. For example, the charge stop criteria level setting unit 450 sets the charge stop criteria level in the time period from the end of a first battery drive time period to the beginning of a second battery drive time period on the basis of the past consumption of power of the battery 1078 in the second battery drive time period. Also, the charge stop criteria level setting unit 450 may change the charge stop criteria level on the basis of the frequency with which the urgent charge direction is input.

Figure 5:
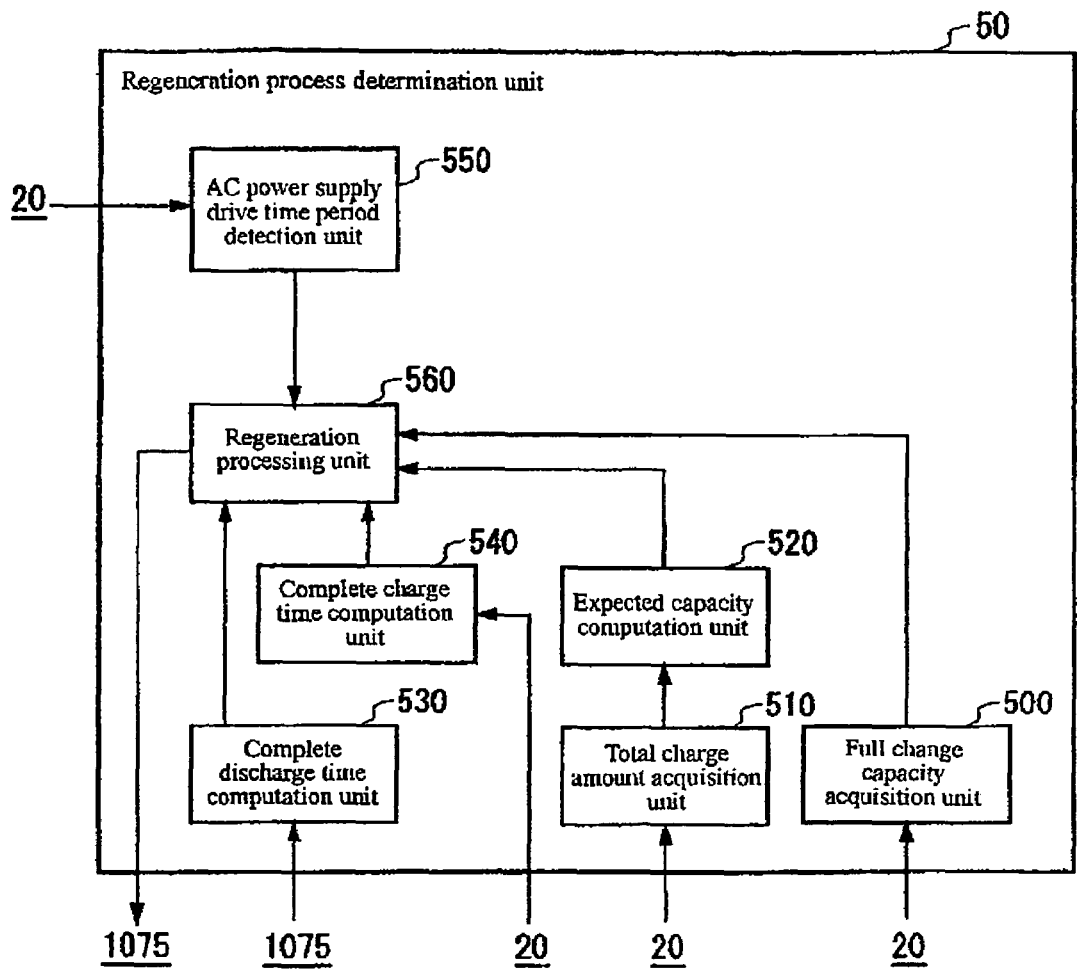
FIG. 5 is a block diagram of a regeneration process determination unit 50.

FIG. 5 is a block diagram of the regeneration process determination unit 50. A full charge capacity acquisition unit 500 obtains the current full charge capacity of the battery 1078 from the drive history storage 20. A total charge amount acquisition unit 510 obtains from the drive history storage 20 the cycle count indicating the total amount of charging from the start of use of the battery 1078 to the present time. An expected capacity computation unit 520 computes an expected capacity which is a full charge capacity the battery 1078 should presently have on the basis of the full charge capacity (e.g., a rated capacity) at the point in time at which use of the battery 1078 was started and the cycle count.

A complete discharge time computation unit 530 computes a complete discharge time as an estimate of a length of time required for the process of completely discharging the battery 1078, on the basis of the current remaining amount of power of the battery 1078 obtained from the power supply control unit 1075. A complete charge time computation unit 540 computes a complete charge time as an estimate of a length of time required for completely charging the battery 1078 from a completely discharged state to a fully charged state, for example, by obtaining a length of time required for charging to the full charge capacity obtained from the drive history storage 20.

An AC power supply drive time period detection unit 550 detects, on the basis of the drive history, a time period in which the proportion of a length of time during which the information processing apparatus 10 was driven by the AC power supply in the past is equal to or higher than a predetermined reference value as an AC power supply drive time period predicted as a time period during which the information processing apparatus 10 will be driven by the AC power supply. When a regeneration processing unit 560 determines that the full charge capacity obtained by the full charge capacity acquisition unit 500 is smaller than a full charge capacity which the battery 1078 should have, and which is determined on the basis of the total charge amount, it executes a battery regeneration process which is a completely charging or completely discharging process for recovering the full charge capacity of the battery 1078. For example, the regeneration processing unit 560 executes the battery regeneration process when the current full charge capacity is smaller than an expected capacity computed by the expected capacity computation unit 520. Preferably, at this time, the regeneration processing unit 560 executes the battery regeneration process further provided that the time period from a lapse of the complete discharge time computed by the complete discharge time computation unit 530 to a lapse of the complete charge time computed by the complete charge time computation unit 540 is an AC power supply drive time period.

For ease of explanation, the regeneration process determination unit 50 is shown in this figure in a state of including the full charge capacity acquisition unit 500, the total charge amount acquisition unit 510 and the expected capacity computation unit 520. The arrangement may alternatively be such that the regeneration process determination unit 50 does not include the full change capacity acquisition unit 500, the total charge amount acquisition unit 510 and the expected capacity computation unit 520, and the regeneration processing unit 560 determines whether or not the battery regeneration process will be performed by using the full charge capacity acquisition unit 442, the total charge amount acquisition unit 444 and the expected capacity computation unit 446.

Figure 6:
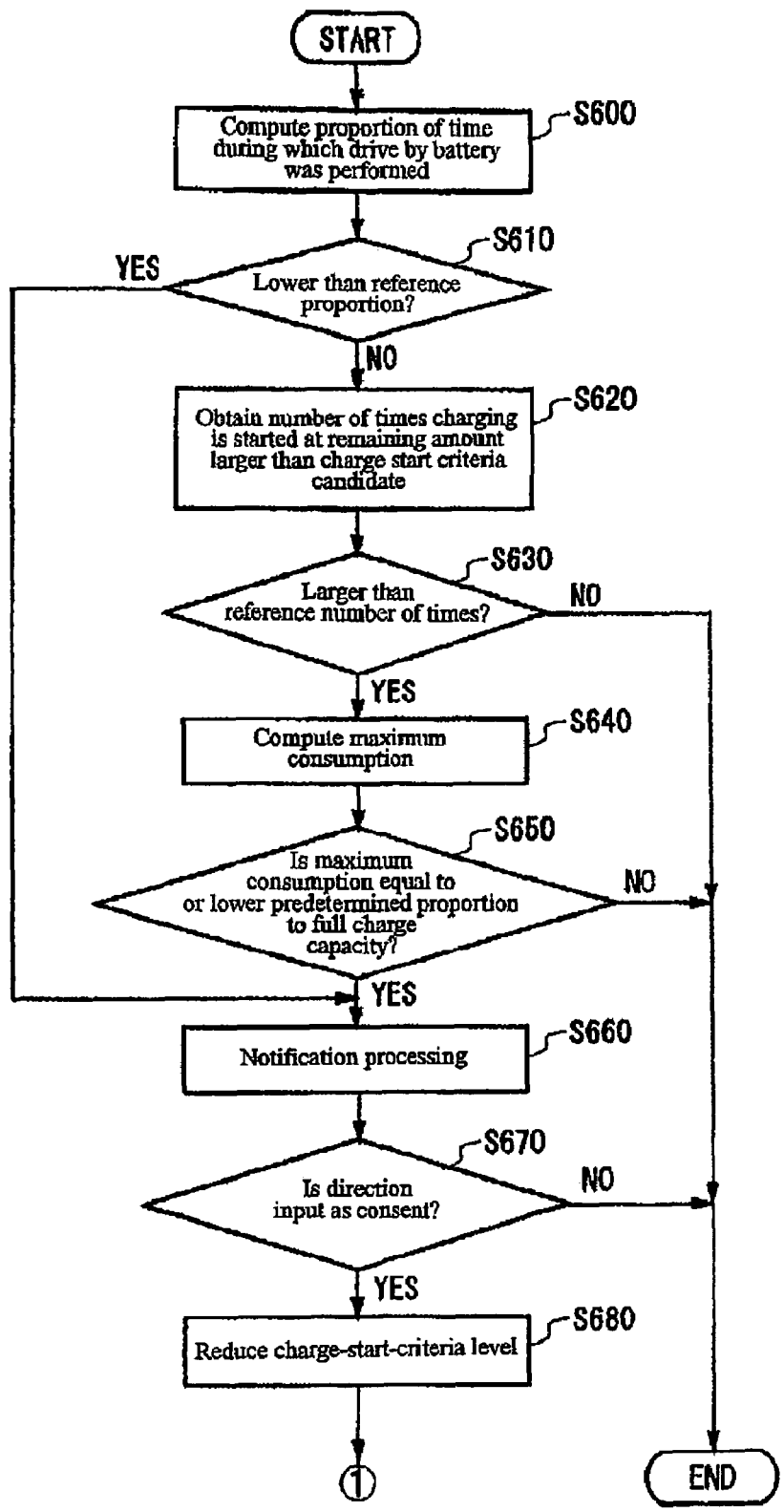
FIG. 6 shows the flow of operation in a process in which the charge/discharge control unit 40 reduces the charge-start-criteria level.

FIG. 6 shows the flow of operation in a process in which the charge/discharge control unit 40 reduces the charge-start-criteria level. The charge/discharge control unit 40 performs processing described below, for example, when the AC power supply is connected to the information processing apparatus 10. First, the recharge-start-criteria level setting unit 440 computes, in the drive condition observation period, the proportion of a length of time during which the information processing apparatus 10 operated in the G0 state while being driven by the battery 1078 (S600). For example, with respect to a case where the information processing apparatus 10 was not drivable by the AC power supply, the recharge-start-criteria level setting unit 440 computes a value as the proportion of a length of time during which the information processing apparatus 10 operated in the G0 state while being driven by the battery 1078 by multiplying the proportion of the length of time during which drive by the AC power supply was not possible by the proportion of the length of time during which operation in the G0 state was performed. If the computed proportion is equal to or lower than the predetermined reference proportion (S610: YES), the recharge-start-criteria level setting unit 440 advances the process to step S660 to notify the user that the charge-start-criteria level will be changed. On the other hand, if the computed proportion is higher than the reference proportion (S610: NO), the charge start count acquisition unit 410 obtains the number of times the remaining amount of the battery 1078 at the point in time at which charging was started, in the drive condition observation period, was determined as a value higher than a predetermined charge-start-criteria level candidate lower than the charge-start-criteria level (S620). For example, if the charge-start-criteria level is set to 95% of the full charge capacity, the charge start count acquisition unit 410 obtains the number of times the remaining amount of the battery 1078 at the point in time at which charging was started was determined as a value lower than 95% of the full charge capacity and higher than 80% of the full charge capacity.

If the obtained number of times is larger than a predetermined reference time (e.g., 20) (S630: YES), the consumption computation unit 420 computes the maximum consumption of power of the battery 1078 that the information processing apparatus 10 continuously consumed in the past without being driven by the AC power supply (S640). For example, if the drive condition observation period is two weeks, a case where charging is started about two times a day in a state in which the remaining amount of the battery 1078 is 80% or higher corresponds to this.

A concrete example of computation of the maximum consumption will be described. The consumption computation unit 420 first detects a time period during which drive by the battery 1078 was continuously performed in the past without driving by the AC power supply. The consumption computation unit 420 then obtains the time during which the operation in the G0 state was effected, the time during which the operation in the G1 state was effected and the time during which the operation in the OFF state was effected in the time period. The consumption computation unit 420 multiplies the amounts of power of the battery 1078 respectively consumed per unit time in the G0, G1 and OFF states by the times during which the operations in the G0, G1 and OFF states were respectively performed, and adds together the results of the multiplication, thereby obtaining the amount of power of the battery 1078 consumed in each time period. The consumption computation unit 420 obtains the maximum consumption by comparing the consumptions of power of the battery 1078 obtained with respect to the time periods.

The amounts of power of the battery 1078 consumed per unit time in the G0, G1 and OFF states may be amounts actually measured or amounts estimated in advance by the manufacturer of the information processing apparatus 10 or the like. For example, in this embodiment, the amount of power of the battery 1078 consumed per unit time in the G1 state is assumed to be 1/24 of that in the G0 state, and the amount of power consumed in the OFF state is assumed to be zero.

If the maximum consumption computed by the consumption computation unit 420 is equal to or lower than a predetermined proportion to the full charge capacity of the battery 1078 (S650: YES), the recharge-start-criteria level setting unit 440 notifies the user that the charge-start-criteria level will be changed (S660). For example, when the maximum consumption computed by the consumption computation unit 420 is 70% of the full charge capacity, lower than the charge-start-criteria level candidate corresponding to 80% of the full charge capacity, the recharge-start-criteria level setting unit 440 notifies the user that the charge-start-criteria level will be changed. The recharge-start-criteria level setting unit 440 then reduces the charge-start-criteria level (S680) provided that a direction is input from the user as a consent to changing the charge-start-criteria level (S670: YES).

Preferably, the recharge-start-criteria level setting unit 440 reduces the charge-start-criteria level to a value equal to or lower than the charge-start-criteria level candidate in S680. In this way, the recharge-start-criteria level setting unit 440 can prevent repeated charging in a case where the remaining amount of power of the battery 1078 is sufficiently large. Also, more preferably, the recharge-start-criteria level setting unit 440 reduces the charge-start-criteria level to a value equal to or lower than the charge-start-criteria level candidate and equal to or higher than the maximum consumption in a case where the maximum consumption is lower than the charge-start-criteria level candidate. Thus, the battery 1078 can be controlled so as not to be easily exhausted as long as the user uses the battery in the same manner as in the past.

Alternatively, the recharge-start-criteria level setting unit 440 may set the charge-start-criteria level to a value 1.5 times or more higher than the maximum consumption. In such a case, however, it is desirable that the recharge-start-criteria level setting unit 440 should set the charge-start-criteria level so that the proportion of the charge-start-criteria level to the full charge capacity is within a predetermined range, e.g., the range from 75% to 95%. For example, if the maximum consumption is 55% of the full charge capacity, the recharge-start-criteria level setting unit 440 sets the charge-start-criteria level to about 83% 1.5 times higher than 55% of the full charge capacity.

The recharge-start-criteria level setting unit 440 displays to the user a message such as shown below as an example of notification processing, and displays buttons for selection between "YES" and "NO". "A setting will be made to inhibit charging when the remaining amount of power of the battery is higher than 80% in order to extend the battery life, because your system is using the AC adapter in almost all cases. Please press the "urgent charge" button in the battery program in case of need for urgent charging even when the remaining amount is 80% or higher. Is it all right if the change is actually made?"

In this message, the recharge-start-criteria level setting unit 440 may send, as an indication of the remaining amount of power of the battery 1078, a notice of how long the information processing apparatus 10 can be further driven by the battery 1078 instead of notifying the proportion of the remaining amount of power to the full charge capacity of the battery 1078.

In such a case, if the user selects "YES", the recharge-start-criteria level setting unit 440 determines that the user has input a direction as a consent to changing the charge-start-criteria level.

In the process described above with reference to the figure, the information processing apparatus 10 can prevent degradation of the battery 1078 by setting the charge-start-criteria level according to the past state of use by the user. The arrangement shown in the figure is only an example, and the condition for setting the charge-start-criteria level is not limited to that described with reference to the figure. For example, the recharge-start-criteria level setting unit 440 may not only set the charge-start-criteria level on the basis of the drive history but also set different charge-start-criteria levels on the basis of in which of the normal mode and the energy saving mode the information processing apparatus 10 operates presently.

Figure 7:
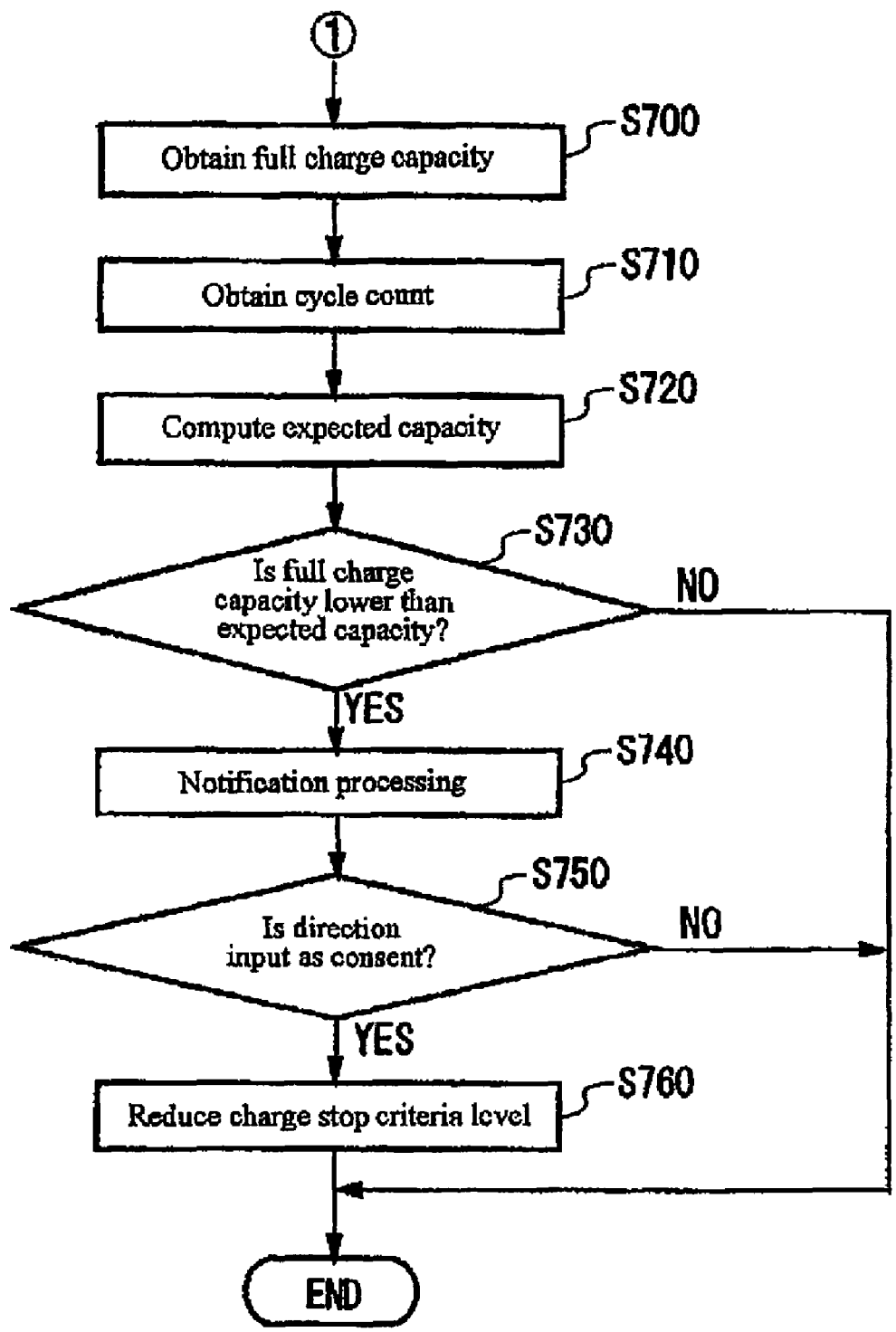
FIG. 7 shows the flow of operation in the process in which the charge/discharge control unit 40 reduces the charge stop criteria level.

FIG. 7 shows the flow of operation in a process in which the charge/discharge control unit 40 reduces the charge stop criteria level. The full charge capacity acquisition unit 442 obtains the current full charge capacity of the battery 1078 (S700). The total charge amount acquisition unit 444 obtains the cycle count indicating the total amount of charging from the start of use of the battery 1078 to the present time (S710). The expected capacity computation unit 446 computes an expected capacity which is a full charge capacity the battery 1078 should presently have, on the basis of the full charge capacity (e.g., a rated capacity) at the point in time at which use of the battery 1078 was started and the cycle count (S720).

If the current full charge capacity of the battery 1078 is smaller than the expected capacity (S730: YES), the charge stop criteria level setting unit 450 notifies the user that the charge stop criteria level will be changed (S740). The charge stop criteria level setting unit 450 reduces the charge stop criteria level (S760) provided that a direction is input from the user as a consent to changing the charge stop criteria level (S750: YES). More specifically, the charge stop criteria level setting unit 450 changes the charge stop criteria level to a level higher than the reduced charge-start-criteria level by a predetermined necessary charge amount. For example, if the recharge-start-criteria level setting unit 440 reduces the charge-start-criteria level to 80%, the charge stop criteria level setting unit 450 changes the charge stop criteria level, which is ordinarily 100%, to 95% higher than 80% by a necessary charge amount of 15 points.

In this way, the charge stop criteria level setting unit 450 can reduce the charge stop criteria level of the battery 1078 on the basis of the drive history and the degree of degradation of the battery. Thus, the remaining amount of power of the battery 1078 is reduced relative to the full charge capacity, provided that the degree of degradation of the battery 1078 is high and that the convenience of the user is not impaired, thereby preventing further degradation of the battery 1078. Each of FIGS. 6 and 7 shows only an example and other various arrangements are conceivable. For example, while the recharge-start-criteria level setting unit 440 reduces the charge-start-criteria level on the basis of the drive history, the charge-start-criteria level may be reduced not on the basis of the drive history but on the basis of the degree of degradation of the battery, or on the basis of the drive history and the degree of degradation of the battery. For example, the recharge-start-criteria level setting unit 440 may reduce the charge-start-criteria level if the current full charge capacity of the battery 1078 is lower than an expected capacity.

Figure 8:
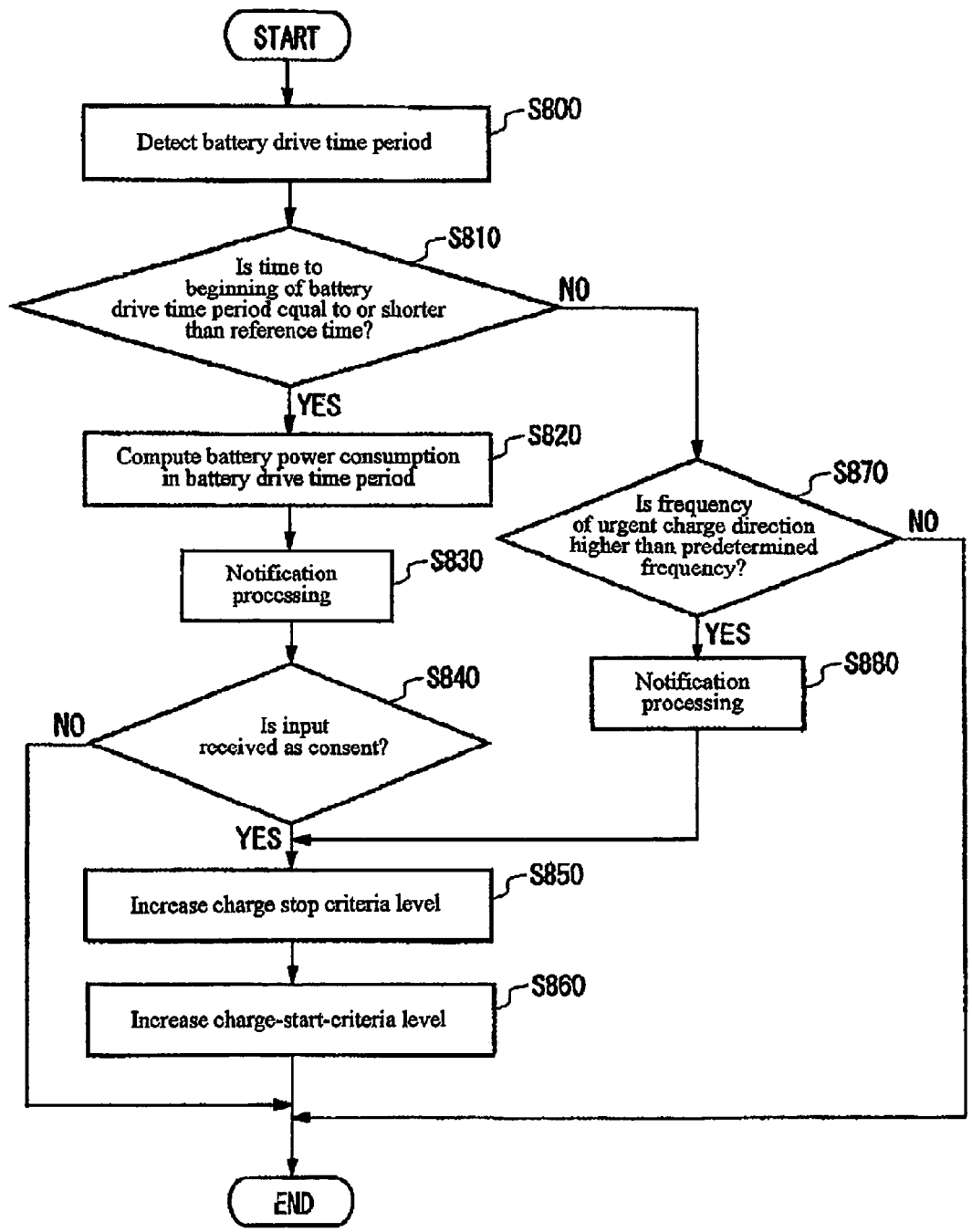
FIG. 8 shows the flow of operation in a process in which the charge/discharge control unit 40 increases the charge-start-criteria level or the charge stop criteria level.

FIG. 8 shows the flow of operation in a process in which the charge/discharge control unit 40 increases the charge-start-criteria level or the charge stop criteria level. The battery drive time period detection unit 430 detects, on the basis of the drive history, a battery drive time period which is a continuous time period in which the proportion of a length of time during which the information processing apparatus 10 was driven by the battery 1078 is higher than a predetermined reference proportion (S800). For example, the battery drive time period detection unit 430 computes, with respect to each time period, the proportion of the length of time during which the information processing apparatus 10 was driven by the battery 1078 by multiplying the proportion of the length of the time during which drive by the AC power supply was not possible in the time period by the proportion of the length of the time during which the operation in the G0 state or in the G1 state was effected.

Each of the recharge-start-criteria level setting unit 440 and the charge stop criteria level setting unit 450 determines whether or not the length of time from the present time to the beginning of the next battery drive time period is equal to or shorter than a predetermined reference time (S810). If the length of time before the beginning of the next battery drive time period is equal to or shorter than the predetermined reference time (S810: YES), the charge stop criteria level setting unit 450 computes the past consumption of power of the battery 1078 in this battery drive time period (S820).

For example, the charge stop criteria level setting unit 450 computes, with respect to each time period included in this battery drive time period, an estimate of the amount of power of the battery 1078 consumed by the information processing apparatus 10 in the time period in the past by multiplying together the proportion of the time during which the information processing apparatus 10 was driven by the AC power supply, the proportion of the time during which the information processing apparatus 10 operated in the G0 state and the battery power consumption in a case where the information processing apparatus 10 continues operating in the G0 state over the time period. The charge stop criteria level setting unit 450 computes a value as the past consumption of power of the battery 1078 in this battery drive time period by adding together the estimates of the consumptions in the time periods in this battery drive time period.

Subsequently, the recharge-start-criteria level setting unit 440 notifies the user that the charge-start-criteria level will be increased and the charge stop criteria level setting unit 450 notifies the user that the charge stop criteria level will be increased (S830). When a direction is input as a content to increasing the charge-start-criteria level and the charge stop criteria level (S840: YES), the charge stop criteria level setting unit 450 increases the charge stop criteria level relative to the charge stop criteria level set in advance (S850) and the recharge-start-criteria level setting unit 440 increases the charge-start-criteria level relative to the charge-start-criteria level set in advance (S860).

Preferably, the charge stop criteria level setting unit 450 changes the charge stop criteria level to a value equal to or higher than the past consumption of power of the battery 1078 in the next battery drive time period as computed in S720. For example, the charge stop criteria level setting unit 450 may set the charge stop criteria level to a value 1.5 times higher than the battery power consumption.

On the other hand, if the length of time from the present time to the beginning of the next battery drive time period is longer than the predetermined reference time (S810: NO), processing described below is performed. If the urgent charge direction is input from the user with a frequency higher than a predetermined reference value in the drive condition observation period for example (S870: YES), the charge-start-criteria level setting unit 440 informs the user that the charge-start-criteria level and the charge stop criteria level will be increased (S880).

The charge-start-criteria level setting unit 440 displays to the user a message shown below as an example of notification processing.

"The condition of use of your system has changed. It is thought to be convenient to set the remaining amount of power of the battery to 95% always when the AC adapter is connected. The value of the remaining amount when charging of the battery is started will be set to 95%."

The process then advances to S850 and S860 and the charge stop criteria level and the charge-start-criteria level are increased.

In the process described above with reference to the figure, the charge stop criteria level and the charge-start-criteria level may be returned to the original levels or increased even after the charge stop criteria level and the charge-start-criteria level have been temporarily reduced, if the possibility of consumption of the power of the battery 1078 is high. Thus, the convenience of the user can be ensured in a case where the possibility that the information processing apparatus 10 will be driven by the battery 1078 is high.

Figure 9:
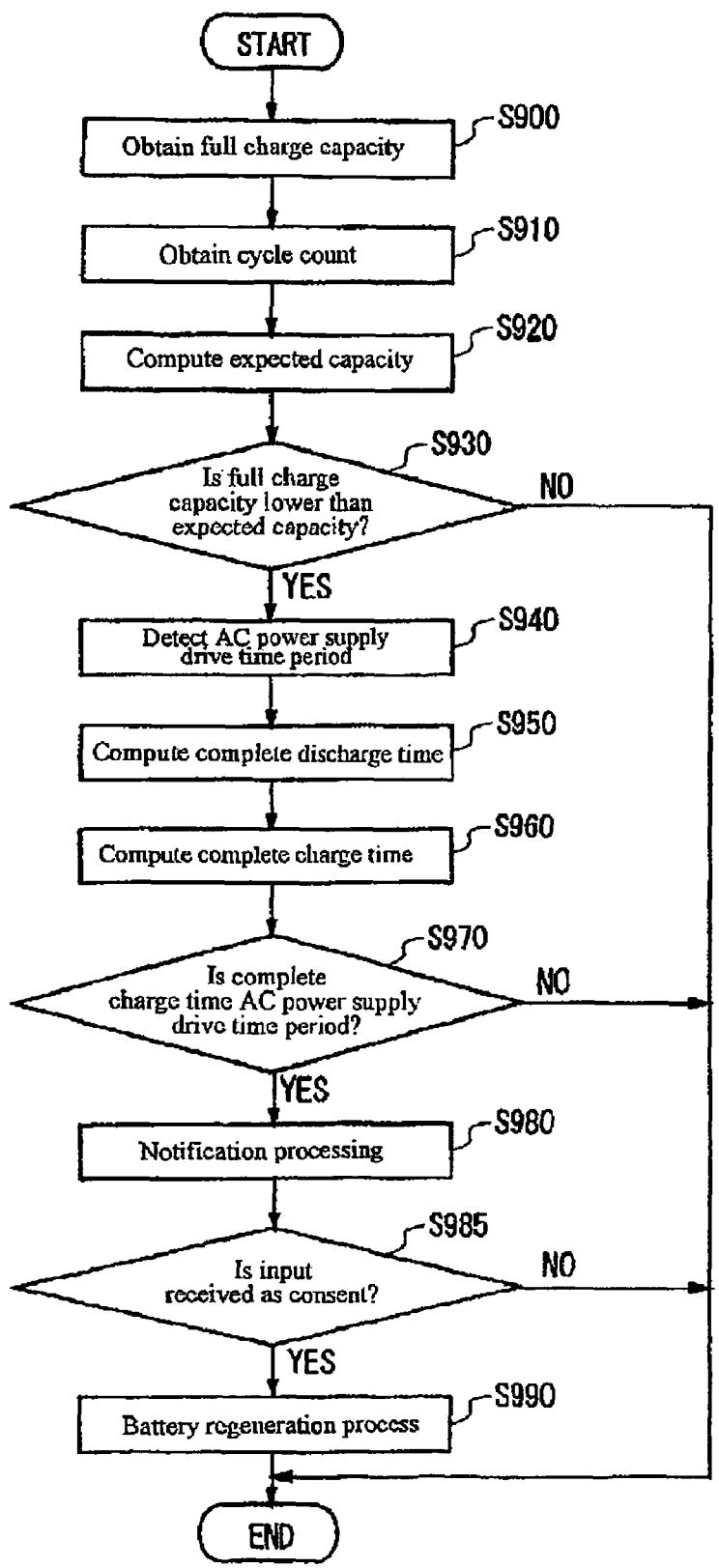
FIG. 9 shows the flow of operation when the regeneration process determination unit 50 performs a battery regeneration process.

FIG. 9 shows the flow of operation when the regeneration process determination unit 50 performs the battery regeneration process. The full charge capacity acquisition unit 500 obtains the current full charge capacity of the battery 1078 (S900). The total charge amount acquisition unit 510 obtains from the drive history storage 20 the cycle count indicating the total amount of charging from the start of use of the battery 1078 to the present time (S910). The cycle count is a value incremented by one each time the total amount of charging of the battery 1078 reaches a predetermined proportion (e.g., 85%) to the full charge capacity of the battery 1078. The total charge amount acquisition unit 510 may obtain not the cycle count but other information indicating the total amount of charging from the start of use of the battery 1078 to the present time.

The expected capacity computation unit 520 computes an expected capacity which is the full charge capacity that the battery 1078 should presently have on the basis of the full charge capacity (e.g., a rated capacity) at the point in time at which use of the battery 1078 was started and the cycle count (S920). For example, the expected capacity computation unit 520 computes an expected capacity by subtracting from the full charge capacity at the point in time at which use of the battery 1078 was started a value obtained by multiplying together the rate at which the full charge capacity is reduced by one cycle count and the obtained cycle count. An example of the computation method will be described.

If the rate at which the full charge capacity is reduced by one cycle count with respect to the rated capacity is $1/15$; the cycle count is X; and the proportion of the full charge capacity to the rated capacity is Add, the proportion Y of an expected capacity to the rated capacity is expressed by the following equation:

$$Y = -X/15 + Add$$

In order to avoid executing the regeneration process excessively frequently, it is desirable to set Add to a value lower by a predetermined amount than the proportion of the full charge capacity to the rated capacity. Once the battery regeneration process is executed by the regeneration processing unit 560, the expected capacity computation unit 520 treats, as the full charge capacity at the point in time at which use of the battery 1078 was started, the capacity obtained by adding to the full charge capacity before a start of use of the battery 1078 after the battery regeneration process the value obtained by multiplying together the cycle count at the point in time at which the battery regeneration process was executed and the rate at which the full charge amount is reduced by one cycle count.

The regeneration processing unit 560 terminates the process shown in the figure if the current full charge capacity is equal to or higher than the estimated capacity computed by the expected capacity computation unit 520 (S930: NO). On the other hand, if the current full charge capacity is lower than the estimated capacity computed by the expected capacity computation unit 520 (S930: YES), the AC power supply drive time period detection unit 550 detects a time period in which the proportion of the time during which the information processing apparatus 10 was driven by the AC power supply in the past is higher than a predetermined reference value as an AC power supply drive time period predicted as a time period in which the information processing apparatus 10 will be driven by the AC power supply (S940).

Alternatively, the regeneration processing unit 560 may perform processing in such a manner that the full charge capacity and the total amount of charging are obtained periodically for example, and the rate at which the full charge amount of the battery 1078 is reduced according to the total amount of charging is computed on the basis of a plurality of full charge capacities and total amounts of charging obtained. In such a case, if the computed rate of reduction is higher than a reference reduction rate determined in advance with respect to the battery 1078, the regeneration processing unit 560 determines that full charge capacity of the battery 1078 is lower than an expected capacity. Thus, in a case where it is predicted that the full charge capacity will be lower than an expected capacity, it is possible to execute the battery regeneration process before the full charge capacity actually becomes lower than the expected capacity.

The complete discharge time computation unit 530 computes a complete discharge time as an estimate of the time required to completely discharge the battery 1078 on the basis of the current remaining amount of power of the battery 1078 obtained from the power control unit 1075 (S950). The complete discharge time computation unit 530 may compute as a complete discharge time a time obtained by adding a predetermined value (e.g., 30 minutes) to the time required for complete discharging, which is computed on the basis of the current remaining amount of power of the battery 1078. The complete charge time computation unit 540 computes a complete charge time as an estimate of the time required for completely charging the battery 1078 from a completely discharged state to a fully charged state, for example, by obtaining a time required for charging to the full charge capacity obtained from the drive history storage 20 (S960). Similarly, the complete charge time computation unit 540 may compute as a complete charge time a time obtained by adding a predetermined value (e.g., 30 minutes) to the time required for charging to the full charge capacity.

The regeneration processing unit 560 terminates the process if the time period from a lapse of the complete discharge time computed by the complete discharge time computation unit 530 to a lapse of the complete charge time computed by the complete charge time computation unit 540 is not an AC power supply drive time period (S970: NO). On the other hand, if the time period from a lapse of the complete discharge time computed by the complete discharge time computation unit 530 to a lapse of the complete charge time computed by the complete charge time computation unit 540 is an AC power supply drive time period (S970: YES), the regeneration processing unit 560 notifies the user that the battery regeneration process will be executed (S980). In this case, it is desirable that if the urgent charge button is pressed, the regeneration processing unit 560 should notify even during execution of the battery regeneration process that the battery regeneration process will be stopped and start charging.

If an input is received as a consent to execution of the battery regeneration process (S985: YES), the regeneration processing unit 560 executes the battery regeneration process (S990). For example, the regeneration processing unit 560 performs complete discharging and complete charging of the battery 1078 in this order as the battery regeneration process. The regeneration processing unit 560 may first perform complete charging of the battery 1078 and subsequently perform complete discharging depending on the kind of the battery 1078 to be subjected to the battery regeneration process. In some cases, e.g., a case where the full charge capacity is not increased by performing the battery regeneration process one time, the regeneration processing unit 560 may repeatedly perform the battery regeneration process a certain number of times. It is desirable to set a limit to the number of times the battery regeneration process is repeated, since degradation of the battery 1078 is accelerated if the battery regeneration process is excessively repeated.

Figure 10:
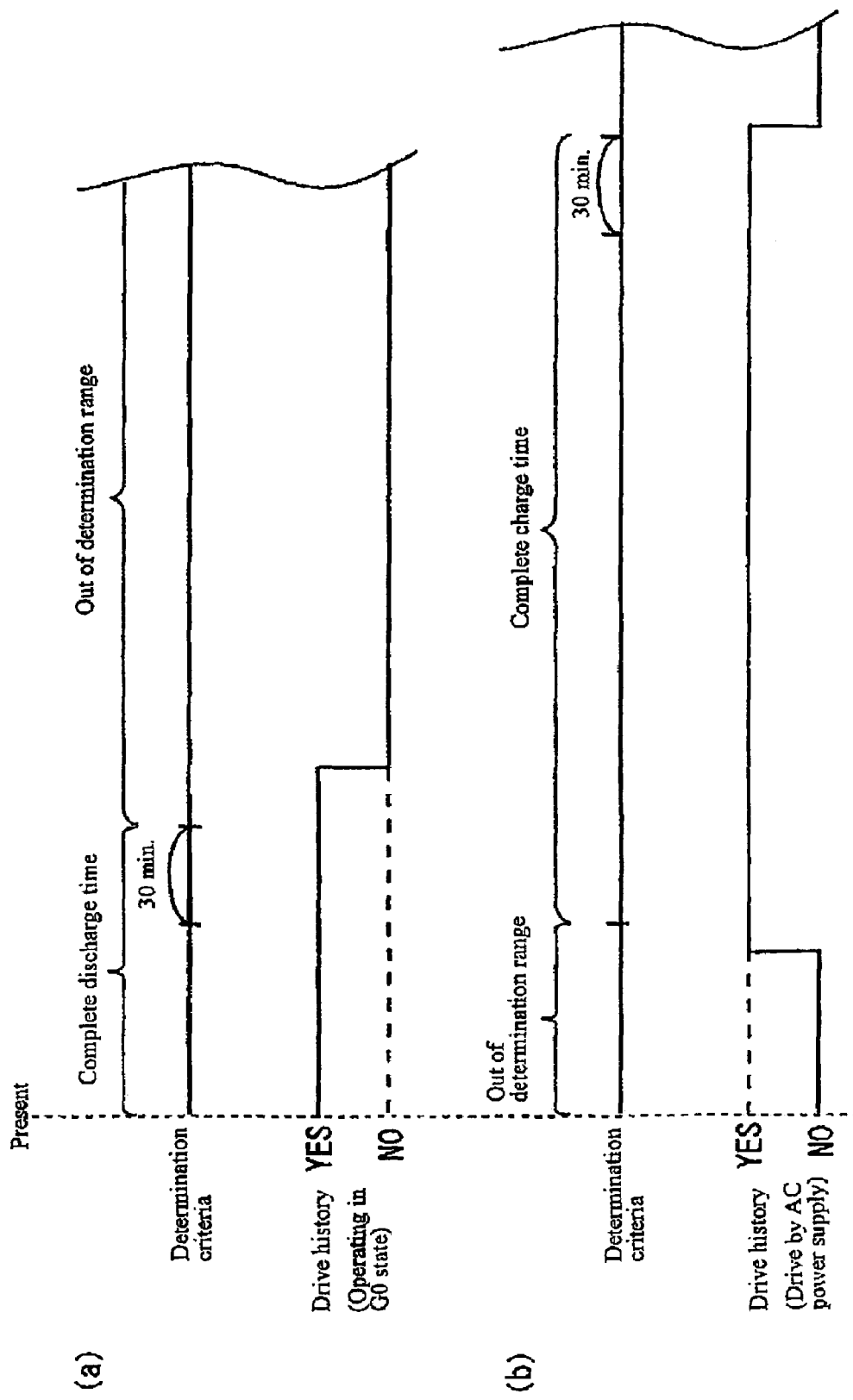
FIG. 10 is a diagram for explaining timing of the battery regeneration process.

FIG. 10 is a diagram for explaining timing of the battery regeneration process. In a case where the information processing apparatus 10 is capable of complete discharging only in the G0 state for example, it is desirable that the regeneration processing unit 560 should make determination as to a condition shown in (a). More specifically, the complete discharge time computation unit 530 computes as an estimate of the complete discharge time a length of time determined by adding 30 minutes to the time for completely discharging the battery 1078. The regeneration processing unit 560 then determines, on the basis of the drive history, that complete discharging can be suitably performed if the proportion of the time during which the information processing apparatus 10 operated in the G0 state is equal to or higher than a predetermined proportion (e.g., 75%) in the time period from the present time to the end of the complete discharge time in the past.

In this way, the time required for complete discharging can be suitably secured even in a case where the information processing apparatus 10 has no forcible quick discharge function.

The regeneration processing unit 560 also makes determination as to a condition shown in (b). More specifically, the complete charge time computation unit 540 computes as an estimate of the complete charge time a length of time determined by adding 30 minutes to the time for completely charging the battery 1078. The regeneration processing unit 560 then determines, on the basis of the drive history, that complete charging can be suitably performed if the proportion of the time during which the information processing apparatus 10 was driven by the AC power supply is equal to or higher than a predetermined proportion (e.g., 75%) in the time period from a lapse of the complete discharge time to the completion of complete discharging in the past.

In this way, the possibility of the AC power supply being stopped during complete charge processing is reduced to make it possible to suitably perform the battery regeneration process.

Further, the regeneration processing section 560 may make determination shown in the figure from a starting point at each point in time in a week as well as from the present starting point. According to this method, the regeneration processing unit 560 can not only determine whether or not the battery regeneration process should be performed at the present time but also detect a time suitable for starting the battery regeneration process. In this case, the regeneration processing unit 560 may output to the user a plurality of times suitable for starting the battery regeneration process and may start the battery regeneration process at one of the output times selected by the user.

If each of AC power supply drive time periods is shorter than the time required for complete charging, it is preferred that the regeneration processing unit 560 perform the battery regeneration process in the longest one of the detected AC power supply drive time periods. Also in this case, the regeneration processing unit 560 may display to the user the times at which the plurality of AC power supply drive time periods begin, and may perform the battery regeneration process at one of the displayed beginning times selected by the user.

According to this embodiment, as described above, the information processing apparatus 10 can suitably set timing of starting and stopping charge of a rechargeable battery to prevent degradation of the battery in such a range that the convenience of the user is not impaired. When degradation of the battery occurs, the degraded state of the battery is suitably detected to perform the battery regeneration process for recovery of the full charge capacity of the battery.

While the present invention has been described with respect to an embodiment thereof, the technical scope of the present invention is not limited to that described above with respect to the embodiment. It is apparent to those skilled in the art that various changes or modifications can be made in the described embodiment. As is also apparent from the description of the appended claims, other forms including such changes or modifications are also included in the technical scope of the present invention.

According to the above-described embodiment, an information processing apparatus, a control method, a program and a recording medium described below can be complemented.

What is claimed is:

1. An information processing apparatus comprising:
    a rechargeable battery for powering the apparatus when no other power source is available;
    an AC power supply for powering the apparatus and charging the battery;
    a charge directing unit for initiating charging of said battery from said AC power supply in response to a remaining amount of power of said battery being lower than a predetermined charge-start-criteria level and said information processing apparatus being driven by said AC power supply;
    a drive history storage for storing a drive history comprising historical information indicating which of said AC power supply and said battery was driving said information processing apparatus during certain time periods in the past; and
    a recharge-start-criteria-level-setting unit for setting said charge-start-criteria level on the basis of said drive history.

2. The information processing apparatus according to claim 1, wherein the apparatus operates in a normal mode in which a central processing unit of the apparatus performs computation processing or in an energy saving mode in which the central processing unit does not perform computation processing and in which power consumption is reduced relative to that in the normal mode, and;
    wherein, in response to a length of time in a predetermined time period in the past during which the apparatus was operating in the normal mode while being driven by said battery is less than a first threshold, said recharge-start-criteria-level-setting unit reduces the charge-start-criteria level.

3. The information processing apparatus according to claim 2, further comprising
- a charge start count acquisition unit which obtains a number of times a remaining amount of power of said battery when charging is started during a predetermined time period in the past is higher than a predetermined charge-start-criteria level candidate, which candidate is lower than the charge-start-criteria level;
- wherein said recharge-start-criteria-level-setting unit reduces the charge-start-criteria level to a value lower than the charge-start-criteria level candidate in response to the number of times obtained by said charge start count acquisition unit being larger than a predetermined reference number.

4. The information processing apparatus according to claim 1, further comprising
- a consumption computation unit which determines a historical maximum power consumption of said apparatus while continuously being driven by said battery;
- wherein said recharge-start-criteria-level-setting unit sets the charge-start-criteria level on the basis of the maximum consumption determined by said consumption computation unit.

5. The information processing apparatus according to claim 4, wherein the apparatus operates in a normal mode in which a central processing unit of the apparatus performs computation processing or in an energy saving mode in which the central processing unit does not perform computation processing and in which power consumption is reduced relative to that in the normal mode,
- wherein said drive history comprises the proportion of a length of time in the past during which the apparatus was driven by said AC power supply, the proportion of the length of time in the past during which the apparatus was operating in the normal mode, and the proportion of the length of time in the past during which the apparatus was operating in the energy saving mode, and
- wherein said consumption computation unit computes the maximum consumption on the basis of the drive history.

6. The information processing apparatus according to claim 1, further comprising a battery drive time period detection unit which detects a battery drive time period which is a time period during which the proportion of said time period when the apparatus was driven by said battery is higher than a predetermined reference proportion,
- wherein in response to the apparatus being driven by said battery for a period of time nearing said battery drive time period, said recharge-start-criteria-level-setting unit increases the charge-start-criteria level.

7. The information processing apparatus according to claim 1, wherein said charge directing unit charges said battery by said AC power supply in response to a charge request input from a user, regardless of the charge-start-criteria level, and
- wherein said recharge-start-criteria-level-setting unit increases the charge-start-criteria level if said charge request input is received from the user with a frequency higher than a predetermined reference frequency.

8. The information processing apparatus according to claim 1, wherein said recharge-start-criteria-level-setting unit notifies a user that the charge-start-criteria level will be changed, and changes the charge-start-criteria level only in response to a consent input from the user.

9. The information processing apparatus according to claim 1, wherein said charge directing unit stops charging said battery in response to the remaining power of said battery reaching a predetermined charge stop criteria level, the apparatus further comprising a charge-stop-criteria-level-setting unit which changes the charge stop criteria level on the basis of the drive history in response to the charge-start-criteria level being changed.

10. The information processing apparatus according to claim 1, wherein said charge directing unit stops charging said battery in response to the remaining power of said battery reaching a predetermined charge stop criteria level, the apparatus further comprising:
- a full charge capacity acquisition unit which obtains a full charge capacity of said battery;
- a total charge amount acquisition unit which obtains a total amount of charging from the start of use of said battery to the present time; and
- a charge-stop-criteria-level-setting unit which reduces the charge stop criteria level in response to a determination that the full charge capacity is lower than an expected full charge capacity which is determined on the basis of the total amount of charging.

11. The information processing apparatus according to claim 10 further comprising:
- a battery regeneration unit for regenerating said battery by fully discharging and charging said battery in response to a determination that said full charge capacity of said battery is lower than said expected full charge capacity.

12. The information processing apparatus according to claim 11, further comprising:
- an AC power supply drive time period detection unit which determines, based on the drive history, an AC power supply drive time period comprising a period of time during which the proportion of time the apparatus was being driven by said AC power supply is higher than a predetermined reference proportion; and
- said battery regeneration unit performs said battery regeneration only during a next AC power supply drive time period sufficiently long to complete a battery discharge and charge cycle.

* * * * *